INFRA-RED RESPONSIVE DEVICES

Filed Nov. 29, 1957

Inventor:
Jacques M. N. Hanlet

Attorney:
Ralph B. Stewart 3,015,034

INFRA-RED RESPONSIVE DEVICES

Jacques Marie Noël Hanlet, Paris, France, assignor to Societe d'Electronique et d'Automatisme, Courbevoie, France Filed Nov. 29, 1957, Ser. No. 699,577
Claims priority, application France Feb. 28, 1957
1 Claim. (Cl. 250—211)

The present invention relates to infra-red responsive devices and has for its main object a device for converting an infra-red light into a visible display.

According to one aspect of the invention an infra-red responsive device comprises a photoconductive layer exhibiting a resistance characteristic which has different values in the presence and absence of infra-red rays incident thereon and an electroluminescent layer adapted to be activated in dependence upon a change of said resistance characteristic from one value to the other.

Figure 1A:
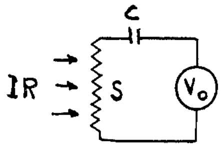
Figure 1B:
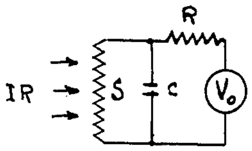
Figure 2A:
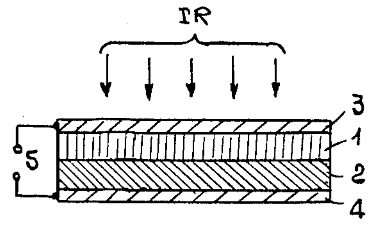
Figures 2B, 3:
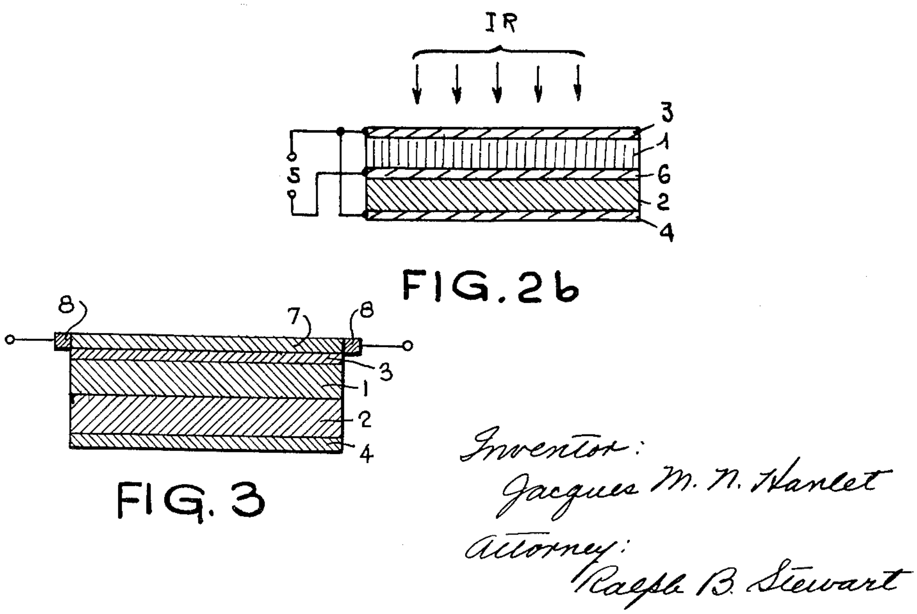

The various features and advantages of the invention will be apparent from the following description of two embodiments given by way of example and illustrated in the accompanying drawings, wherein:

FIGURES 1*a* and 1*b* respectively show two circuit diagrams of a device according to the invention, FIGURES 2*a* and 2*b* respectively show two devices according to the invention corresponding to the circuit diagrams of FIGURES 1*a* and 1*b*.

FIGURE 3 shows a further embodiment of the invention.

In these illustrative embodiments, the infra-red rays impinging upon the surface of the device are indicated by a plurality of arrows denoted IR, the focussing of which may be understood as being effected in any conventional manner.

Referring to the electrical circuit diagrams of FIGURES 1*a* and 1*b*, a photoconductive layer is shown at S as a resistance, and an electroluminescent layer is shown at C as a capacitance, $V_0$ denotes an "alternating" source of electrical potential, this word being not restricted to a sine waveform of electrical potential. The resistance value of S is controlled by the incident rays IR so as to be of a substantially low value when such rays actually impinge upon this resistance member and of a substantially high value when no such rays impinge thereon.

In FIGURE 1*a*, the two members S and C are serially connected in an electrical circuit including the electrical source $V_0$. Consequently, when the internal resistance of S is at its higher value, the voltage difference across C is too small to activate the electroluminescence therein. Such a condition may be so adjusted that the voltage difference may be just under the threshold of activation of the electroluminescent layer. Each time the infra-red rays IR appear, the sudden lowering of the internal resistance value of S causes a sudden increase of the voltage difference across C and the electroluminescence thereof is activated thus displaying on this member the visible image or picture of the incoming infra-red beam.

In the diagram of FIGURE 1*b*, the two members S and C are connected in parallel and the parallel combination is supplied from the source $V_0$ through an ohmic resistor R. In this case, it is when the infra-red rays IR exist that the voltage difference across C will be at the lower value whereas when the infra-red rays are not present the voltage difference across C will be of the higher value thus activating the electroluminescence. It is apparent that the voltage difference across C depends upon the consumption of current in the series resistor R and the shunt resistance S. An advantage of this second arrangement with respect to the first is that the loss angle within the material of the electroluminescent member has appreciably less effect upon the operativeness of the unit.

If the impinging rays are amplitude modulated or keyed, the voltage source $V_0$ may be a simple D.C. source at least for such an arrangement as shown in FIGURE 1*a*. In the case of FIGURE 1*b*, the voltage source will preferably be an alternating current source for suitably sustaining the electroluminescence within C in the absence of the infra-red rays.

The embodiments corresponding to these electrical diagrams are shown in FIGURES 2*a* and 2*b*. According to FIGURE 2*a*, the two layers 1 and 2, respectively the photoconductive and the electroluminescent layers, are applied against each other between a pair of film electrodes 3 and 4, the electrode 3 being translucent to the impinging infra-red rays and the electrode 4 being translucent to the light emitted by the electroluminescent layers 2 when this layer is activated. Such a composite member, or "sandwich" may be obtained by depositing, according to any suitable process, the electrode films and the layers in sequence onto a translucent dielectric supporting plate (not shown): for instance, a metallic film such as aluminium or the like is formed over a pure silica plate, then the electroluminescent layer 2 is formed over the metallic film, then the photoconductive layer 1 is formed over the layer 2, and finally the other electrode film 3 is formed over the photoconductive layer 1. The thickness of the layers 1 and 2 may be of the order of some hundreds of microns.

The embodiment shown in FIGURE 2*b*, for use in the circuit diagram of FIGURE 1*b*, only differs from that of FIGURE 2*a* in that an intermediate layer 6 of conductive film character is formed between the electroluminescent and photoconductive layers 2 and 1 of the unit.

For the purpose of such units, several materials may be used for making the material of the photoconductive and of the electroluminescent layers. As photoconductive materials, there may be mentioned silicon, germanium, lead sulphide, lead telluride and lead selenide. The choice within this group will essentially depend upon the average wave-length of the infra-red radiation to be received, converted and enhanced therein. Indium monosulphide is also suitable. As to the electroluminescent materials, quite a number of compositions are presently known which may be used as, for instance compositions based on the use of sulphides or oxides of zinc, cadmium, and others. The choice thereof will be made with respect to that of the photoconductive material so that no potential barrier will appear at the common plane thereof (as seen in FIGURE 2*a*) whilst giving a required band of visible spectrum in the final display.

It may be noted that, in such a device as herein above described the "noise" will be dependent to an extent upon the choice of the infra-red responsive material per se and the choice of suitably adapted photoconductive and electroluminescent materials. When, however, the level of noise is found to be higher than permissible, it is possible to have recourse to further measures as shown in FIG. 3. These consist in keying the infra-red rays by making them pass previously to their action on the device described above through a germanium crystal 7 or the like, the transparency to infra-red of which is keyed by a square wave-form voltage applied across electrodes 8 thereof from a source not shown, the electrodes not being traversed by the infra-red rays. In this case, the voltage $V_0$ may be D.C. even when the infra-red rays are not in themselves A.C. modulated or keyed previously to the said keying arrangement.

What is claimed is:

An infra-red responsive device comprising the combination of an electroluminescent cell, circuit means for applying an activating potential to said cell, in infra-red responsive photoconducting resistance connected in the said circuit means whose resistance is lower when infra-red light impinges thereon than in the absence of infra-red light made of a material selected from the group consisting of silicon, germanium, indium sulfide, lead sulfide, lead telluride and lead selenide, a germanium crystal arranged to intercept the infra-red light before it impinges upon said resistance, said crystal having modulating electrodes arranged out of the path of said light, and means supplying an alternating potential to modulate the transparency of the crystal to said light.

References Cited in the file of this patent

UNITED STATES PATENTS

| | | |
|---|---|---|
| 2,120,916 | Bitner | June 14, 1938 |
| 2,177,360 | Busse | Oct. 24, 1939 |
| 2,773,992 | Ullery | Dec. 11, 1956 |
| 2,798,823 | Harper | July 9, 1957 |
| 2,805,360 | McNaney | Sept. 3, 1957 |
| 2,818,511 | Ullery et al. | Dec. 31, 1957 |
| 2,883,556 | Jenny et al. | Apr. 21, 1959 |
| 2,890,350 | Lempicki | June 9, 1959 |
| 2,891,169 | Nicoll | June 16, 1959 |
| 2,898,556 | Matarese | Aug. 4, 1959 |
| 2,929,923 | Lehovec | Mar. 22, 1960 |

FOREIGN PATENTS

| | | |
|---|---|---|
| 157,101 | Australia | June 16, 1954 |

OTHER REFERENCES

Kazan et al.: Proceedings of the I.R.E.; volume 43; No. 12; December 1955, pp. 1888–1897.

Schulz et al.: Proceedings of the I.R.E.; volume 43, No. 12; December 1955, pp. 1818–1828.

Moss: Proceedings of the I.R.E.; volume 43; No. 12; December 1955; pp. 1869–1881.